US008955742B2

(12) United States Patent
Shih et al.

(10) Patent No.: US 8,955,742 B2
(45) Date of Patent: Feb. 17, 2015

(54) SELF-SERVICE TERMINAL

(75) Inventors: Chih-Kun Shih, Santa Clara, CA (US); Yang-Jie Luo, Shenzhen (JP); Wan-Cheng Luo, Shenzhen (JP); Si-Long Li, Shenzhen (JP); Xiang-Xiong Xiao, Shenzhen (JP); Jie Peng, Shenzhen (JP)

(73) Assignees: Hong Fu Jin Precision Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 617 days.

(21) Appl. No.: 12/955,929

(22) Filed: Nov. 30, 2010

(65) Prior Publication Data

US 2012/0001524 A1 Jan. 5, 2012

(30) Foreign Application Priority Data

Jul. 5, 2010 (CN) .......................... 2010 1 0216435

(51) Int. Cl.
*G07F 19/00* (2006.01)
*G06Q 40/00* (2012.01)

(52) U.S. Cl.
CPC ............ *G07F 19/202* (2013.01); *G07F 19/203* (2013.01); *G07F 19/205* (2013.01); *Y10S 902/08* (2013.01); *Y10S 902/09* (2013.01); *Y10S 902/30* (2013.01)
USPC ......... 235/379; 705/43; 902/8; 902/9; 902/30

(58) Field of Classification Search
CPC ................ G07F 19/201–19/205; G07F 19/20; G07F 19/00
USPC ........... 235/375, 379, 380; 705/35–45; 902/8, 902/9, 30; 312/223.1
See application file for complete search history.

(56) References Cited

U.S. PATENT DOCUMENTS

| | | | | |
|---|---|---|---|---|
| 5,483,047 | A * | 1/1996 | Ramachandran et al. | 235/379 |
| 6,328,206 | B1 * | 12/2001 | Schanz et al. | 235/379 |
| 7,416,111 | B1 * | 8/2008 | Kovacs et al. | 235/379 |
| 7,726,558 | B1 * | 6/2010 | Lute et al. | 235/379 |
| 8,181,857 | B1 * | 5/2012 | Lute et al. | 235/379 |
| 8,342,398 | B2 * | 1/2013 | Douglass et al. | 235/379 |
| 2004/0222286 | A1 * | 11/2004 | Douglass et al. | 235/381 |

* cited by examiner

*Primary Examiner* — Thien M Le
*Assistant Examiner* — April Taylor
(74) *Attorney, Agent, or Firm* — Novak Druce Connolly Bove + Quigg LLP

(57) ABSTRACT

A self-service terminal includes a safety box, a main control module, an operating module, and a shielding member. The main control module includes a casing and a mounting frame mounted in the casing. The mounting frame is attached on the safety box. The casing includes a pair of side panels and a top panel connecting between the pair of side panels. The pair of side panels and the top panel is detachably attached to the mounting frame. The operating module is attached to a front side of the main control module. The shielding member is attached to the safety box and encloses the operating module.

17 Claims, 5 Drawing Sheets

SELF-SERVICE TERMINAL

BACKGROUND

1. Technical Field

The present disclosure relates to electronic devices, more particularly a self-service terminal.

2. Description of Related Art

Self-service terminals are developed to allow users access to a variety of transactions, such as bank customers depositing and withdrawing currency, and making account inquiries, and others. As new self-service terminals come into use, software often needs to be updated. In use, self-service terminals frequently malfunction, making maintenance a significant concern for owners of new and old devices. However, the casings of self-service terminals are usually integrally formed and difficult to detach, complicating maintenance of the self-service terminal.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
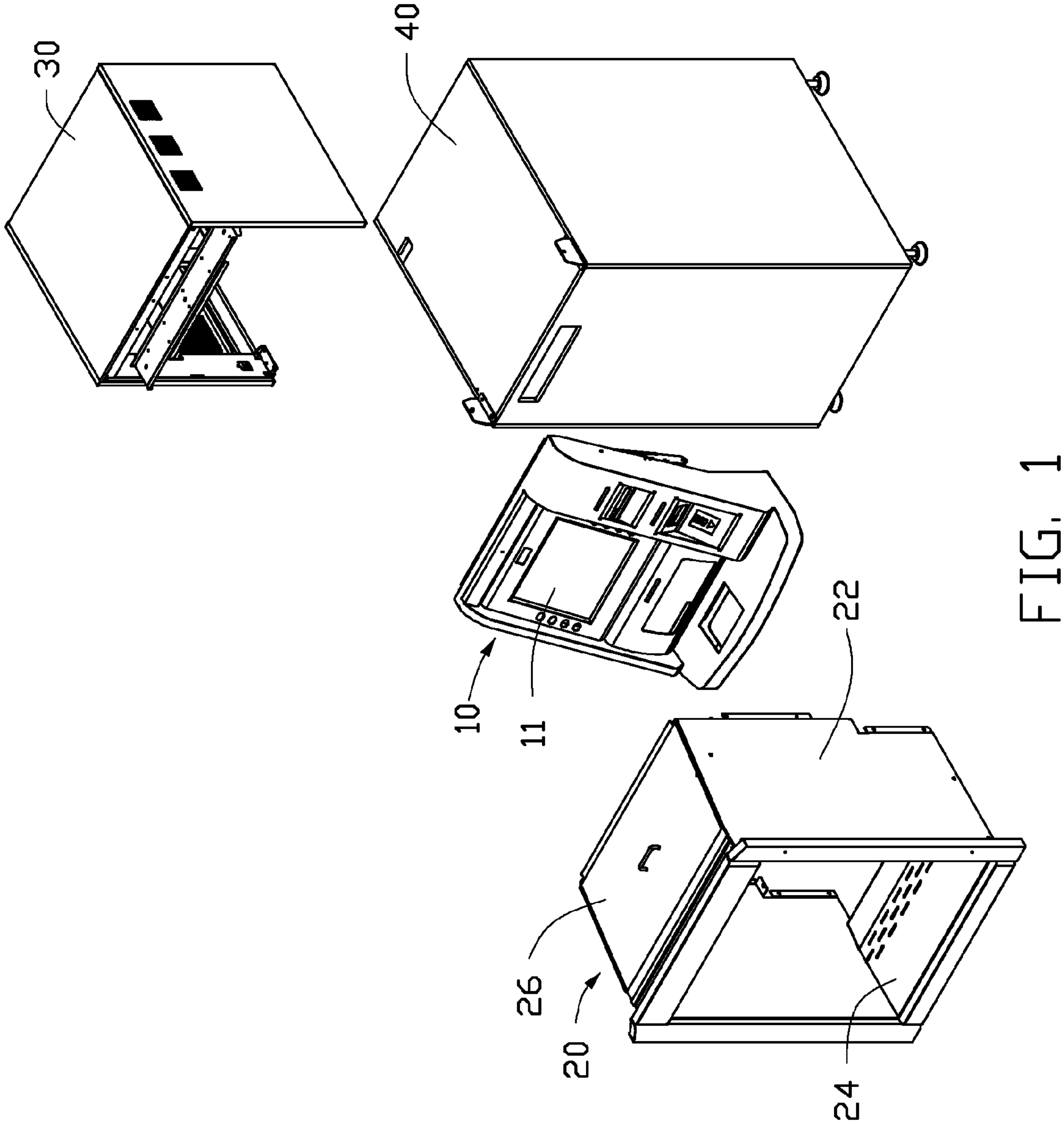
FIG. 1 is an isometric and exploded view of a self-service terminal in accordance with an embodiment.
Figure 2:
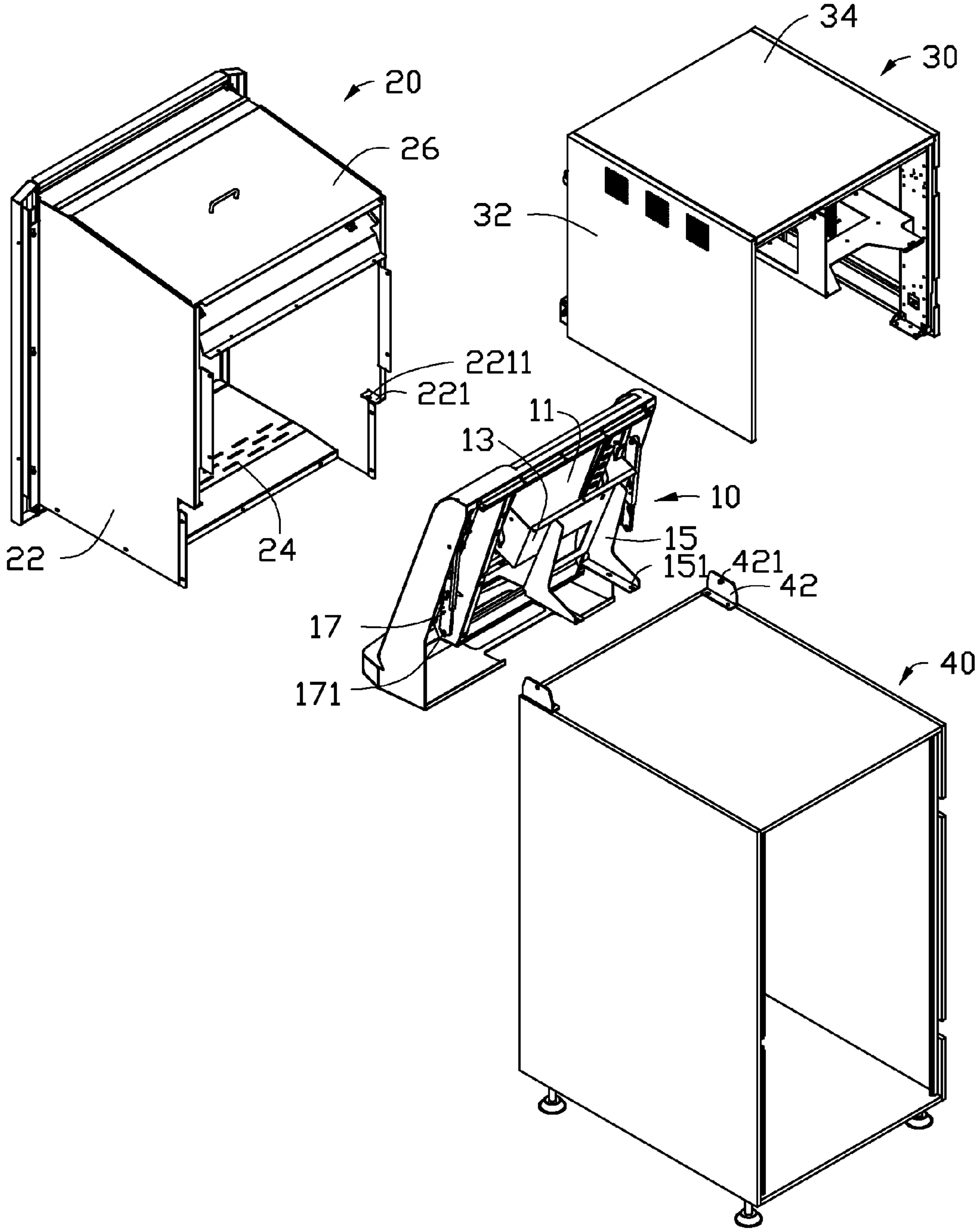
FIG. 2 is another isometric view of the self-service terminal of FIG. 1, viewed from another aspect.

Referring to FIGS. 1 and 2, an embodiment of a self-service terminal includes an operating module 10, a shielding member 20, a main control module 30, and a safety box 40.

The operating module 10 includes a display opening 11, a keyboard opening 12, and apertures (not labeled) providing card input and record output access. The operating module 10 further includes a support frame 13 attached at a rear side of the display opening 11 and a support bracket 15 secured to a rear side of the support frame 13. The support bracket 15 includes a pair of securing flanges 151 extending from a pair of base edges. The operating module 10 further includes a pair of angled arms 17 at a rear side thereof. A securing aperture 171 is defined in a distal end of each of the angled arms 17. A pair of L-shaped securing members 42 is attached on the safety box 40. A securing hole 421 is defined in each of the securing members 42 corresponding to the securing aperture 171 of the operating module 10.

The shielding member 20 includes a pair of side plates 22, a base plate 24 connecting between bottom flanges of the side plates 22, and a top plate 26 connecting between top flanges of the side plates 22. Each of the side plates 22 of the shielding member 20 has a securing tab 221 at a rear side thereof. A fastening hole 2211 is defined in the securing tab 221 of each of the side plates 22.

Figure 3:
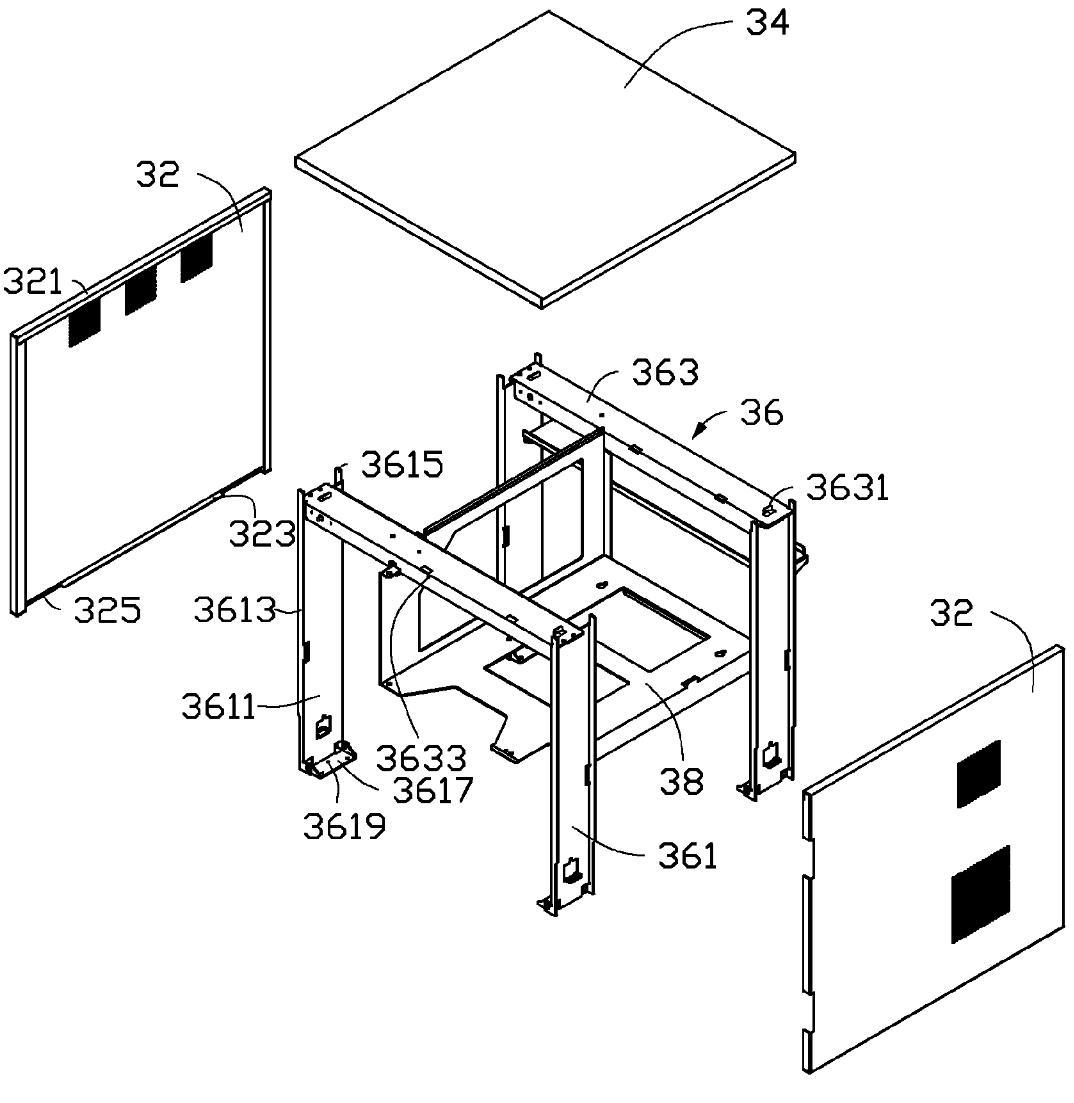
FIG. 3 is an isometric and exploded view of a main control module of the self-service terminal of FIG. 1.
Figure 4:
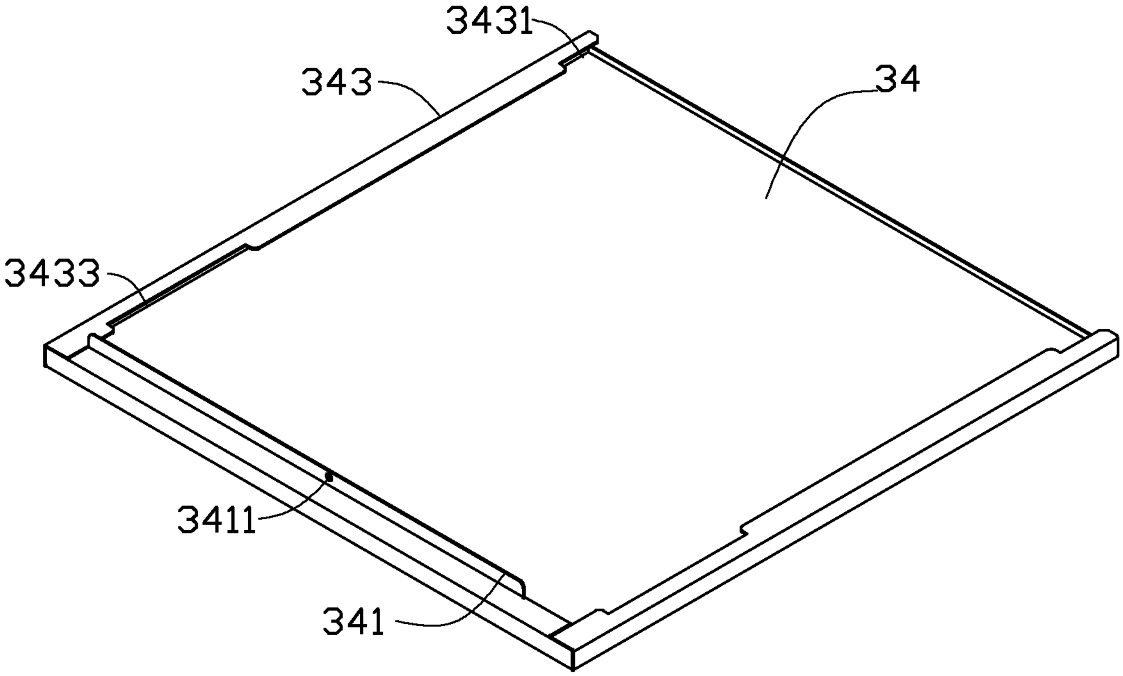
FIG. 4 is another view of a top panel of the main control module of FIG. 3.

Referring to FIGS. 3 and 4, the main control module 30 includes a casing and a mounting frame 36. The casing of the main control module 30 includes a pair of side panels 32 and a top panel 34 connecting the pair of side panels 32. The mounting frame 36 includes four vertical struts 361 and a pair of horizontal struts 363 attached on the vertical struts 361. Each of the vertical struts 361 includes a main piece 3611, a pair of flanges 3613 extending outwards from opposite side edges of the main piece 3611, and a base tab 3617 extending inwards from a bottom edge of the main piece 3611. Multiple screw holes 3619 are defined in the base tab 3617 of each of the vertical struts 361. A pair of limiting tabs 3615 protrudes upwardly from the pair of flanges 3613 of each of the vertical struts 361. The distal end of each of the horizontal struts 363 is held between the pair of limiting tabs 3615 of one corresponding vertical strut 361. A pair of blocking tabs 3631 protrudes upwardly from each of the horizontal struts 363. The pair of blocking tabs 3631 is adjacent to the limiting tabs 3615 of the vertical struts 361. A fixing hole 3633 is defined in one of the horizontal struts 363. An L-shaped tray 38 is mounted in the mounting frame 36 for seating a computer or other data processing apparatus therein.

Each of the side panels 32 of the main control module 30 includes an L-shaped top flange 321 extending from a top edge thereof and a bottom flange 323 extended from a bottom edge thereof. A pair of gaps 325 is defined in the bottom flange 323. A width of each of the gaps 325 is substantially equal to the width of each of the vertical struts 361. The top panel 34 of the main control module 30 includes a pair of L-shaped side flanges 343 extending from a pair of opposite side edges of the top panel 34. A first notch 3431 and a second notch 3433 are defined in each of the L shaped side flanges 343. The top panel 34 further includes a fixing flange 341 extending from a rear edge thereof. A mounting hole 3411 is defined in the fixing flange 341.

In assembly of the main control module 30, the side panels 32 of the main control module 30 are attached to outer sides of the two pairs of the vertical struts 361. The limiting tabs 3615 of the vertical struts 361 extend into an inner side of the top flanges 321 of the side panels 32. The lower ends of the vertical struts 361 are held in the gaps 325 of the side panels 32, which are thereby fixed in position. The top panel 34 is attached on the horizontal struts 363 and resists the top flanges 321 of the pair of side panels 32. The blocking tabs 3631 of the horizontal struts 363 are held with edges of the first notches 3431 and the second notches 3433 of the top panel 34. The mounting hole 3411 is aligned with the fixing hole 3633 of the horizontal strut 363. A fastener (not shown) is received in the mounting hole 3411 and the fixing hole 3633 to securely attach the top panel 34 on the horizontal struts 363. The side panels 32 can be further secured to the mounting frame 36 by fasteners or other securing members.

Figure 5:
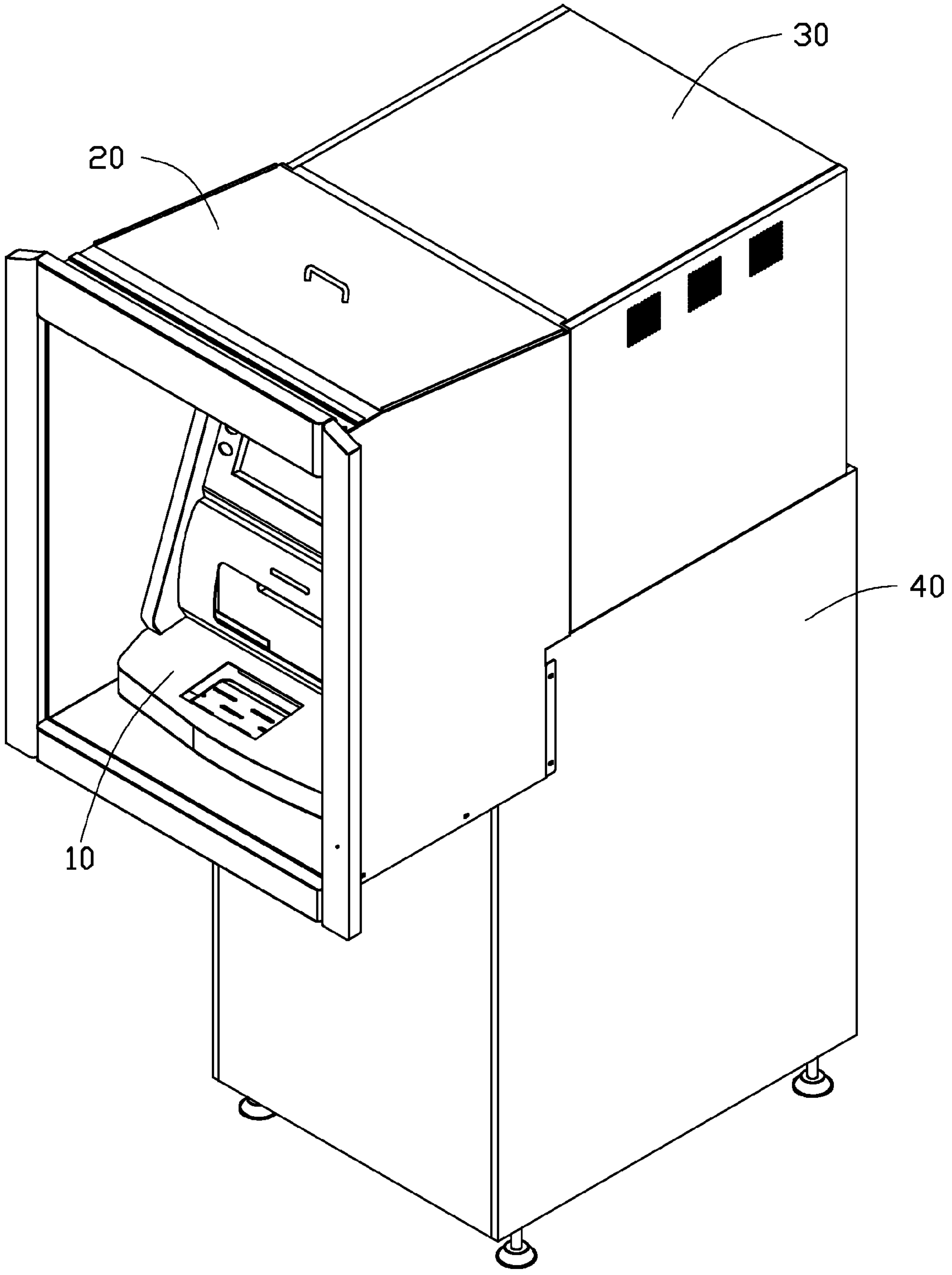
FIG. 5 is an assembled view of the self-service terminal of FIG. 1.

Referring to FIG. 5, in assembly of the self-service terminal, the securing aperture 171 of the operating module 10 is aligned with the securing hole 421 of the securing member 42 attached on the safety box 40. A fastener (not shown) is received in the securing aperture 171 of the operating module 10 and the securing hole 421 of each of the securing members 42. The securing flanges 151 of the operating module 10 are secured on a top panel of the safety box 40 by fasteners or other securing members, such that the operating module 10 is securely attached to the safety box 40. The securing tabs 221 of the shielding member 20 abut the top panel of the safety box 40. A fastener is received in the fastening hole 2211 of each of the securing tabs 221 and one corresponding securing hole (not shown) defined in the top panel of the safety box 40. Then the shielding member 20 is secured to the safety box 40 and encloses the operating module 10. Afterwards, multiple fasteners (not shown) are received in the screw holes 3619 of the base tab 3617 of the main control module 30 and corresponding securing holes (not shown) defined in the top panel of the safety box 40. Thus, the main control module 30 is secured on the top panel of the safety box 40.

In one embodiment, the casing of the main control module 30 is constructed from separate panels including the side panels 32 and the top panel 34, which can be easily detached and facilitate access.

While the present disclosure has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present disclosure will readily appear to those skilled in the art. Therefore, the present disclosure is not limited to the specific details and illustrative examples shown and described.

What is claimed is:

1. A self-service terminal comprising:

a safety box;

a main control module comprising a casing and a mounting frame mounted in the casing, the mounting frame located on the safety box, the casing comprises a pair of side panels and a top panel connecting the pair of side panels, and the pair of side panels and the top panel are detachably attached on the mounting frame;

an operating module attached to a front side of the main control module; wherein a display opening is defined in the operating module, a support frame is attached at a rear side of the display opening, and a support bracket attached to a rear surface of the support frame; the support bracket comprises a pair of L-shaped portions and a pair of securing flanges extending from bottom edges of the pair of L-shaped portions; and the pair of securing flanges is secured on a top panel of the safety box; the rear surface of the support frame is oblique relative to the top panel, and the pair of securing flanges is substantially parallel to the top panel; and a shielding member, attached to the safety box, that encloses the operating module.

2. The self-service terminal of claim 1, wherein the mounting frame comprises two pairs of vertical struts attached to the safety box and a pair of horizontal struts attached to the two pairs of vertical struts, the pair of side panels are attached to the two pairs of vertical struts, and the top panel is attached to the pair of horizontal struts.

3. The self-service terminal of claim 2, wherein at least one blocking tab protrudes from each of the pair of horizontal struts, the top panel comprises a side flange, at least one notch is defined in the side flange, and the at least one blocking tab is engaged with the at least one notch.

4. The self-service terminal of claim 2, wherein a base tab extends from a bottom edge of each of the two pairs of vertical struts, and the base tab is attached to the safety box.

5. The self-service terminal of claim 2, wherein each of the two pairs of vertical struts includes a main piece and a pair of flanges extending from opposite side edges of the main piece, a pair of limiting tabs protrude from the pair of flanges, and one end of each of the pair of horizontal struts is engaged between the pair of limiting tabs.

6. The self-service terminal of claim 5, wherein each of the pair of side panels comprises an L-shaped top flange, and the pair of limiting tabs is engaged with an inner side of the L-shaped top flange.

7. The self-service terminal of claim 5, wherein each of the pair of side panels includes a bottom flange with a gap, and each of the two pairs of vertical struts is engaged with the gap.

8. The self-service terminal of claim 1, wherein the operating module comprises a pair of angled arms that is oblique relative to a front surface of the operating module, a securing aperture is defined in a distal end of each of the pair of angled arms, a pair of securing members is attached on the safety box, a securing hole is defined in each of the pair of securing members corresponding to the securing aperture, and the pair of angled arms is secured to the pair of securing members.

9. A self-service terminal comprising:

a safety box;

a main control module comprising a pair of side panels, a top panel connecting the pair of side panels, and a mounting frame, the mounting frame attached to a top of the safety box, the pair of side panels and the top panel detachably attached at an outside of the mounting frame;

an operating module attached to a front side of the main control module; wherein a display opening is defined in the operating module, a support frame is attached at a rear side of the display opening, and a support bracket attached to a rear surface of the support frame; the support bracket comprises a pair of L-shaped portions and a pair of securing flanges extending from bottom edges of the pair of L-shaped portions; and the pair of securing flanges is secured on a top panel of the safety box; the rear surface of the support frame is oblique relative to the top panel, and the pair of securing flanges is substantially parallel to the top panel; and a shielding member, attached to the safety box, that encloses the operating module.

10. The self-service terminal of claim 9, wherein the mounting frame comprises two pairs of vertical struts attached to the safety box and a pair of horizontal struts attached to the two pairs of vertical struts; the pair of side panels are attached to the two pairs of vertical struts, and the top panel are attached on the pair of horizontal struts.

11. The self-service terminal of claim 10, wherein at least one blocking tab protrudes from each of the pair of horizontal struts, the top panel comprises a side flange, at least one notch is defined in the side flange, and the at least one blocking tab is engaged with an edge of the at least one notch.

12. The self-service terminal of claim 10, wherein a base tab is extending from a bottom edge of each of the two pairs of vertical struts, and the base tab is attached to the safety box.

13. The self-service terminal of claim 10, wherein each of the two pairs of vertical struts includes a main piece and a pair of flanges extending from opposite side edges of the main piece, a pair of limiting tabs protrudes from the pair of flanges, and one end of each of the pair of horizontal struts is engaged between the pair of limiting tabs.

14. The self-service terminal of claim 13, wherein each of the pair of side panels comprises an L-shaped top flange, and the pair of limiting tabs is engaged into an inner side of the L-shaped top flange.

15. The self-service terminal of claim 13, wherein each of the pair of side panels includes a bottom flange with a gap, and each of the two pairs of vertical struts is engaged in the gap.

16. The self-service terminal of claim 9, wherein the operating module comprises a pair of angled arms that is oblique relative to a front surface of the operating module, a securing aperture is defined in a distal end of each of the pair of angled arms, a pair of securing members is attached to the safety box, a securing hole is defined in each of the pair of securing members corresponding to the securing aperture, and the pair of angled arms is secured to the pair of securing members.

17. The self-service terminal of claim 9, wherein an L-shaped tray is mounted in the mounting frame.

* * * * *